United States Patent
Liu et al.

(10) Patent No.: US 9,680,376 B2
(45) Date of Patent: Jun. 13, 2017

(54) POWER CONVERSION ELECTRONICS HAVING CONVERSION AND INVERTER CIRCUITRY

(71) Applicant: Cree, Inc., Durham, NC (US)

(72) Inventors: XueChao Liu, Kowloon (HK); John Mookken, Raleigh, NC (US)

(73) Assignee: Cree, Inc., Durham, NC (US)

( * ) Notice: Subject to any disclaimer, the term of this patent is extended or adjusted under 35 U.S.C. 154(b) by 399 days.

(21) Appl. No.: 14/193,842

(22) Filed: Feb. 28, 2014

(65) Prior Publication Data
US 2015/0249384 A1    Sep. 3, 2015

(51) Int. Cl.
| | |
|---|---|
| *H02M 3/158* | (2006.01) |
| *H02M 7/537* | (2006.01) |
| *H02M 3/156* | (2006.01) |
| *H02M 7/487* | (2007.01) |
| *H02M 1/08* | (2006.01) |

(Continued)

(52) U.S. Cl.
CPC .......... *H02M 3/158* (2013.01); *H02M 3/156* (2013.01); *H02M 7/487* (2013.01); *H02M 7/537* (2013.01); *H02M 1/08* (2013.01); *H02M 3/33507* (2013.01); *H02M 7/1557* (2013.01); *H02M 2001/007* (2013.01)

(58) Field of Classification Search
CPC .......... H02M 1/088; H02M 2001/007; H02M 3/33507; H02M 7/1557
See application file for complete search history.

(56) References Cited

U.S. PATENT DOCUMENTS

| | | |
|---|---|---|
| 5,132,889 A | 7/1992 | Hitchcock et al. |
| 8,477,519 B2 | 7/2013 | Nakamura et al. |

(Continued)

FOREIGN PATENT DOCUMENTS

| | | |
|---|---|---|
| EP | 2811638 A1 | 12/2014 |
| WO | 2012090242 A1 | 7/2012 |

OTHER PUBLICATIONS

Liu, Jimmy et al., "Performance Evaluations of Hard-Switching Interleaved DC/DC Boost Converter with New Generation Silicon Carbide MOSFETs," Aug. 6, 2013, http://www.cree.com/~/media/Files/Cree/Power/Articles%20and%20Papers/Power_Article_4.pdf, Cree, Inc., 6 pages.

(Continued)

*Primary Examiner* — Jue Zhang
*Assistant Examiner* — Lakaisha Jackson
(74) *Attorney, Agent, or Firm* — Anthony J. Josephson

(57) ABSTRACT

A power conversion apparatus and individual components thereof is described. In general, the power conversion apparatus converts a DC output received from an appropriate source, such as string of solar panels, to an AC output. The AC output may be a single-phase or three-phase, sinusoidal AC signal. The inverter system may include a boost converter, which is a DC-to-DC converter, and an inverter, which is essentially a DC-AC converter. In operation, the boost converter will boost the DC output from the appropriate source to a desired DC output voltage. The inverter will convert the DC output voltage to a desired single-phase or three-phase output voltage at a desired frequency, such as 50 or 60 hertz. The boost converter and the inverter may be packaged together in an appropriate sealed and weatherproof housing.

14 Claims, 3 Drawing Sheets

(51) Int. Cl.
  *H02M 3/335* (2006.01)
  *H02M 7/155* (2006.01)
  *H02M 1/00* (2006.01)

(56) References Cited

U.S. PATENT DOCUMENTS

| | | | |
|---|---|---|---|
| 2008/0103632 A1* | 5/2008 | Saban | H02K 3/28 700/286 |
| 2008/0316780 A1* | 12/2008 | Saren | H02M 1/08 363/78 |
| 2010/0301826 A1* | 12/2010 | Moussaoui | H02M 3/1584 323/285 |
| 2012/0039092 A1 | 2/2012 | Xu et al. | |
| 2012/0126728 A1* | 5/2012 | El-Refaie | H02K 11/33 318/139 |
| 2012/0294045 A1 | 11/2012 | Fornage et al. | |
| 2012/0326646 A1 | 12/2012 | Tanaka et al. | |
| 2013/0002215 A1* | 1/2013 | Ikeda | H02M 3/158 323/271 |
| 2013/0063184 A1* | 3/2013 | Liang | H01L 21/8213 327/108 |
| 2014/0104901 A1* | 4/2014 | Nguyen | H02M 1/44 363/48 |
| 2014/0355313 A1 | 12/2014 | Nishikawa | |
| 2015/0055374 A1 | 2/2015 | Yamashita et al. | |
| 2015/0098250 A1 | 4/2015 | Wu et al. | |
| 2015/0256084 A1 | 9/2015 | Liu et al. | |

OTHER PUBLICATIONS

International Search Report and Written Opinion for International Patent Application No. PCT/US2015/018741, mailed Jun. 3, 2015, 11 pages.

Burkart, Ralph M. et al., "Comparative Evaluation of SiC and Si PV Inverter Systems Based on Power Density and Efficiency as Indicators of Initial Cost and Operating Revenue," 2013 IEEE 14th Workshop on Control and Modeling for Power Electronics (COMPEL), Jun. 23-26, 2013, IEEE, 6 pages.

Deboy, Gerald et al., "New SiC JFET Boost Performance of Solar Inverters," Power Electronics Europe, Issue 4, 2011, Access Intelligence, pp. 29-33.

International Search Report and Written Opinion for International Patent Application No. PCT/US2015/017529, mailed Jun. 25, 2015, 20 pages.

Non-Final Office Action for U.S. Appl. No. 14/201,005, mailed Dec. 31, 2015, 5 pages.

Notice of Allowance for U.S. Appl. No. 14/201,005, mailed Aug. 17, 2016, 7 pages.

International Preliminary Report on Patentability for International Patent Application No. PCT/US2015/017529, mailed Sep. 15, 2016, 16 pages.

International Preliminary Report on Patentability for International Patent Application No. PCT/US2015/018741, mailed Sep. 22, 2016, 9 pages.

\* cited by examiner

POWER CONVERSION ELECTRONICS HAVING CONVERSION AND INVERTER CIRCUITRY

FIELD OF THE DISCLOSURE

The present disclosure relates to power conversion electronics.

BACKGROUND

The field of power conversion electronics relates to the control and conversion of electric power. Since power may be provided and used in either direct current (DC) or alternating current (AC) formats and at differing voltage or current levels, there is a continuing need for more efficient and cost-effective DC-to-DC converters, AC-to-DC converters, AC-to-AC converters, and DC-to-AC inverters. With the ongoing movement to harvest green energy, such as solar and wind energy, there is an ever increasing demand for DC-to-DC converters and DC-to-AC inverters for solar power systems that are mounted on the rooftops of commercial and residential buildings, where the overall weight of the power conversion systems becomes an issue for both installation and structural reasons.

SUMMARY

The present disclosure relates to a power conversion apparatus and the individual components thereof. In general, the power conversion apparatus converts a DC output received from an appropriate source, such as string of solar panels, to an AC output. The AC output may be a single-phase or three-phase, sinusoidal AC signal. The inverter system may include a boost converter, which is a DC-to-DC converter, and an inverter, which is essentially a DC-AC converter. In operation, the boost converter will boost the DC output from the appropriate source to a desired DC output voltage. The inverter will convert the DC output voltage to a desired single-phase or three-phase output voltage at a desired frequency, such as 50 or 60 hertz. The boost converter and the inverter may be packaged together in an appropriate sealed and weatherproof housing.

In one embodiment, the power conversion apparatus includes a housing, a DC-DC conversion circuit, and an inverter. The DC-DC conversion circuit is configured to convert a first DC signal to a second DC signal and includes first primary switching circuitry having silicon carbide transistors that are hard switched during the conversion process. The inverter is configured to convert the second DC signal to a sinusoidal AC signal and includes second primary switching circuitry having silicon carbide transistors that are hard switched during the conversion process. The silicon carbide transistors for both the first and second primary switching circuitry may be directly coupled in parallel with one another. Further, the first switching circuitry may include at least one main signal path that includes a pair of parallel silicon carbide diodes that are placed in series in the at least one main signal path.

The power conversion apparatus, including the housing and the electronics therein, has a weight and may achieve an output power-to-weight ratio that can exceed 1 kilowatt/kilogram, and in particular, may achieve a power-to-weight ratio between about 1 kilowatt/kilogram and 3 kilowatts/kilogram. The power conversion apparatus may include one or more controllers that are configured to switch the silicon carbide transistors of the first primary switching circuitry between on and off states at a frequency of between 70 kilohertz and 100 kilohertz during DC-to-DC conversion and switch the silicon carbide transistors of the second primary switching circuitry between on and off states at a frequency of between 35 kilohertz and 60 kilohertz during AC-to-DC conversion.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
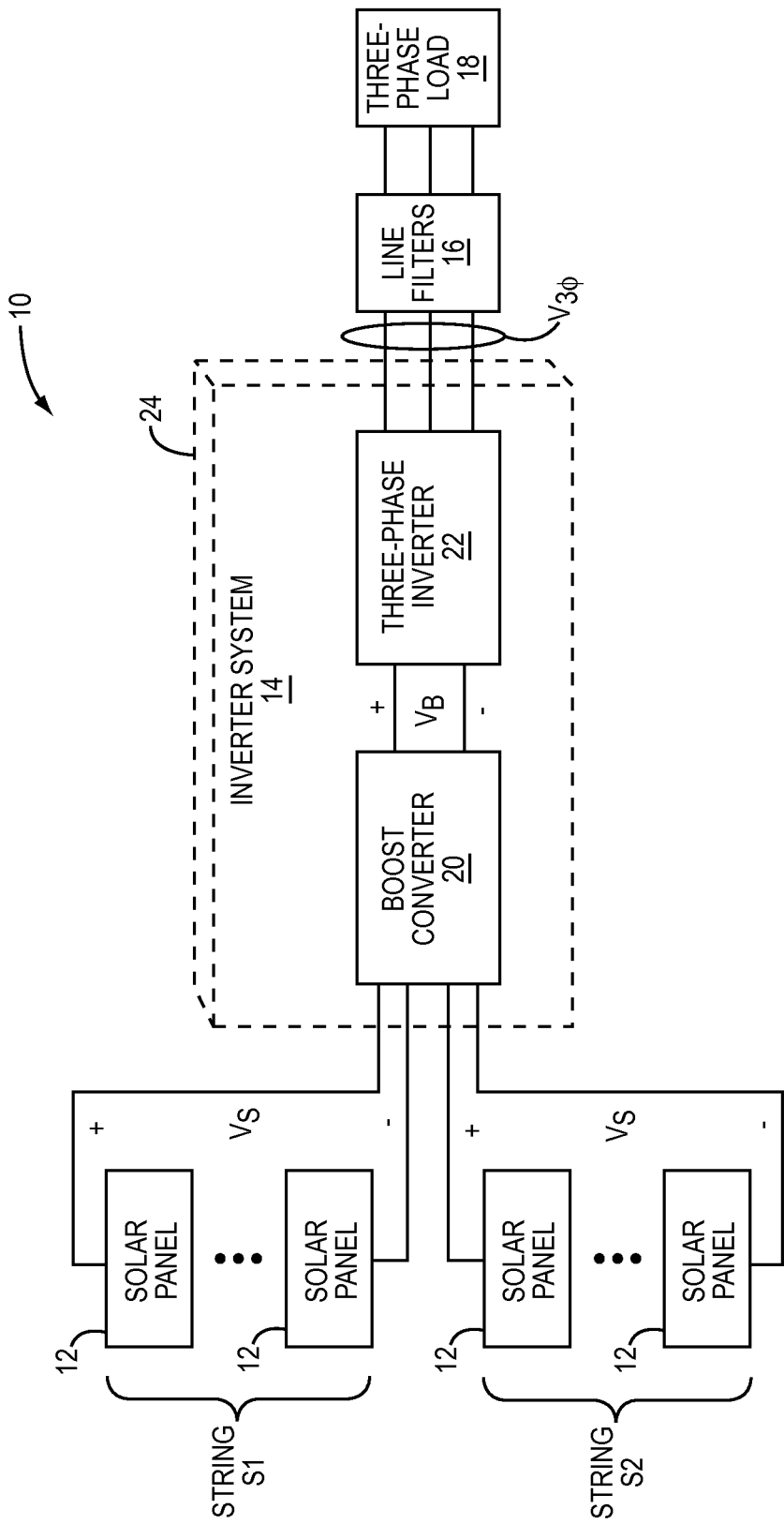
FIG. 1 illustrates a solar energy environment according to one embodiment of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

With reference to FIG. 1, an exemplary solar energy environment 10 is illustrated. Multiple solar panels 12 feed an inverter system 14, which converts a DC input received from the solar panels 12 to an AC output. The AC output is filtered by line filters 16 and fed to a three-phase load 18, which may represent a power grid, building power system, motor, or the like.

The inverter system 14 may include a boost converter 20, which is a DC-to-DC converter, and a three-phase inverter 22, which is a DC-AC converter. As illustrated, the boost converter 20 has two DC inputs, each of which receives the DC output of a corresponding string S1, S2 of series-connected solar panels 12. The DC output voltage of each string S1 is referenced as "$V_S$". While the boost converter 20 is illustrated as having two DC inputs, the boost converter 20 may have a single DC input or more than two DC inputs and may receive power from devices other than solar panels 12.

In operation, the boost converter 20 will boost the DC output voltages $V_S$ of the two strings S1 and S2 to a desired DC output voltage $V_B$, which is fed to the three-phase inverter 22. The three-phase inverter 22 will convert the DC output voltage $V_B$ from the boost converter 20 to a desired three-phase output voltage $V_{3\phi}$ at a desired frequency, such as 50 or 60 hertz. The boost converter 20 and the three-phase inverter 22 may be packaged together in an appropriate sealed and weatherproof housing 24.

In one embodiment, to achieve a three-phase output voltage $V_{3\phi}$ of 480 volts RMS (measured line to line), the three-phase inverter 22 should be presented with a DC output voltage $V_B$ (from the boost converter 20) of at least 650 volts, with a target DC output voltage $V_B$ of 800 volts. As such, the boost converter 20 will boost the variable DC output voltages $V_S$ of the strings S1 and S2 to a DC output voltage $V_B$ of at least 650 volts, and if achievable based on the levels of the DC output voltages $V_S$ of the strings S1 and S2, a fixed DC output voltage $V_B$ of 800 volts. In another embodiment, to achieve a three-phase output voltage $V_{3\phi}$ of 690 volts RMS (measured line to line), the three-phase inverter 22 should be presented with a DC output voltage $V_B$ (from the boost converter 20) of at least 935 volts, with a target DC output voltage $V_B$ of 1000 volts. As such, the boost converter 20 will boost the DC output voltages $V_S$ of the strings S1 and S2 to a DC output voltage $V_B$ of at least 935 volts, and if achievable based on the levels of the DC output voltages $V_S$ of the strings S1 and S2, a DC output voltage $V_B$ of 1000 volts.

Figure 2:
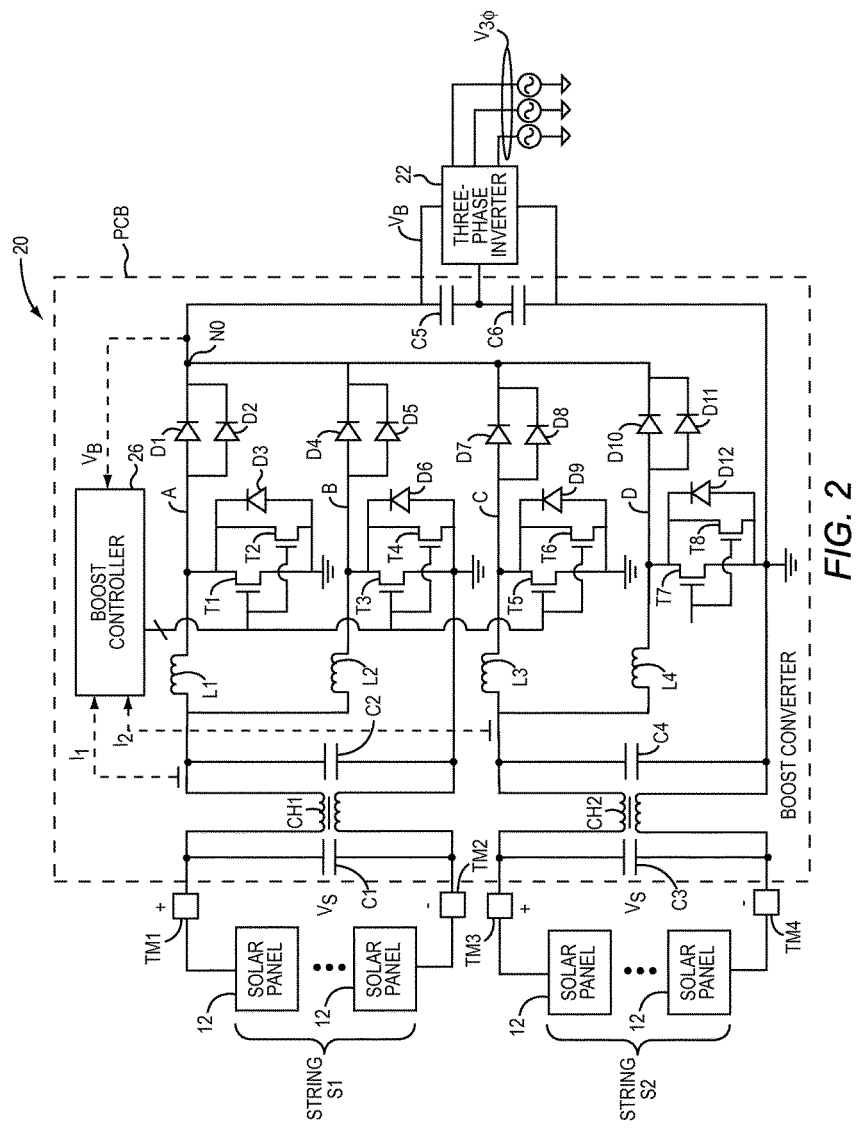
FIG. 2 is a schematic for a boost converter in the solar energy environment of FIG. 1 according to one embodiment of the disclosure.

Turning now to FIG. 2, a high-level schematic of an exemplary boost converter 20 is illustrated. While this particular boost converter configuration is provided as an example, the concept of the present disclosure will equally apply to any number of boost converter configurations that are known to those skilled in the art. The illustrated boost converter 20 has a four-channel, interleaved boost converter configuration. Each channel is designated with a letter A through D and incorporates sufficient circuitry to provide a DC-to-DC conversion.

Channels A and B are arranged to process the DC output from string S1, and channels C and D are arranged to process the DC output from string S2. In particular, the solar panels 12 of string S1 are coupled between terminals TM1 and TM2, which are respectively coupled to inputs of opposite coils of a common mode choke CH1. A large capacitor C1 may be coupled across the terminals TM1 and TM2. The output of the upper coil of the common mode choke CH1 represents the input for channels A and B. A large capacitor C2 is coupled between the input for channels A and B and ground. The output of the lower coil of the common mode choke CH1 is tied to ground.

Channel A terminates at node NO and includes a series inductor L1 and a pair of parallel diodes D1 and D2 along a series path. The anodes of the diode D1 and D2 are coupled to the inductor L1 and the cathodes are coupled to the output node NO. At a point along the main path and between the inductor L1 and the diodes D1 and D2, a shunt circuit to ground is provided. The shunt circuit includes a pair of parallel transistors T1 and T2 as well as at least one anti-parallel diode D3. The diode D3 may represent a body diode that is integrated within the transistors T1 and T2, or may be an additional diode. As such, the gates, drains, and sources of the transistors T1 and T2 are coupled directly to each other, respectively. The diode D3 is coupled in an anti-parallel fashion across the drains and sources of the transistors T1 and T2. The shunt circuitry is considered the primary switching circuitry in this embodiment. The primary switching circuitry for a converter will include those transistors that switch the largest currents and/or voltages.

As noted, channel A and channel B share the same input. Like channel A, channel B terminates at node NO and includes a series inductor L2 and a pair of parallel diodes D4 and D5. At a point between the inductor L2 and the diodes D4 and D5, a shunt circuit to ground is provided. The shunt circuit includes a pair of parallel transistors T3 and T4 as well as at least one anti-parallel diode D6. The diode D6 may represent a body diode that is integrated within the transistors T3 and T4, or may be an additional diode. As above, the gates, drains, and sources of the transistors T3 and T4 are coupled directly to each other, respectively.

Channels C and D are arranged to process the output from string S2. The solar panels 12 of string S2 are coupled between terminals TM3 and TM4, which are respectively coupled to inputs of opposite coils of a common mode choke CH2. A large capacitor C3 may be coupled across the terminals TM3 and TM4. The output of the upper coil of the common mode choke CH2 represents the input for channels C and D. Another large capacitor C4 is coupled between the input for channels C and D and ground. The output of the lower coil of the common mode choke CH2 is tied to ground.

Like channels A and B, channel C terminates at node NO and includes a series inductor L3 and a pair of parallel diodes D7 and D8. At a point between the inductor L3 and the diodes D7 and D8, a shunt circuit to ground is provided. The shunt circuit includes a pair of parallel transistors T5 and T6 as well as at least one anti-parallel diode D9.

Like channels A, B, and C, channel D terminates at node NO and includes a series inductor L4 and a pair of parallel diodes D10 and D11. At a point between the inductor L4 and the diodes D10 and D11, a shunt circuit to ground is provided. The shunt circuit includes a pair of parallel transistors T7 and T8 as well as at least one anti-parallel diode D12. The transistors T1-T8 of the shunt circuits are generally referred to as the switching transistors for the boost converter 20. A pair of series capacitors C5 and C6 is coupled between node NO and ground. Node NO represents the output of the boost converter 20, and as such, the DC output voltage $V_B$ is provided at node NO.

An analog or digital boost controller 26 controls the overall boost function of the boost converter 20. In general, channels A and B will convert the DC output voltage $V_S$ of string S1 to the desired DC output voltage $V_B$. Channels C and D will convert the DC output voltage $V_S$ of string S2 to the desired output voltage $V_B$. Notably, not all of the channels need to operate at the same time. For example, under certain conditions, only one, two, or three of the four channels A through D need to operate at any given time. Determining the number of channels A through D to operate may depend on load demands, output power of the respective strings S1 and S2, and the like.

Further, the DC output voltages $V_S$ of the strings S1 and S2 may differ at any given time as well as continuously vary over time. As such, the boost controller 26 will dynamically control the individual boost functions of channels A through D in an effort to convert the continuously varying and potentially different output voltages $V_S$ of the strings S1 and S2 to a desired (and common) output voltage $V_B$. In this embodiment, the boost controller 26 monitors a first input current $I_1$ at the input for channels A and B, a second input current $I_2$ at the input for channels C and D, and the DC output voltage $V_B$ to determine how to control the individual boost functions for each of the channels A through D.

Each channel A through D is individually controlled by driving the gates of the corresponding pairs of parallel transistors T1-T2 (channel A), T3-T4 (channel B), T5-T6 (channel C), and T7-T8 (channel D) with individual control signals. These control signals may be pulse width modulated (PWM) signals that have variable duty cycles. In essence, the duty cycle of each control signal controls the effective voltage gain for the corresponding channel A through D. Increasing the duty cycle increases the voltage gain, and vice versa. By monitoring the input current $I_1$, $I_2$ for a given channel A through D and the output voltage $V_B$, the boost controller 26 can adjust the duty cycle for the corresponding control signal to ensure the output voltage $V_B$ maintains a desired level.

For channel A, when the corresponding control signal is in a state that turns on transistors T1-T2, the current through inductor L1 is directed to ground through transistors T1-T2. During this phase, the current flowing through inductor L1 is increased toward a desired level based upon how long the transistors T1-T2 remain on. The diodes D1-D2 will block current from flowing back into channel A from node NO. When the control signal is in a state that turns off transistors T1-T2, the current flowing through inductor L1 is forced through diodes D1 and D2 to node NO and either charges the capacitors C5, C6 or drives the three-phase inverter 22. Channels B through D operate in the same manner.

When all or multiple channels A though D are operating, the phase of the respective control signals may be offset throughout the switching period. Assuming each control signal has the same operating frequency, offsetting the phase of the control signals offsets the output waveforms that appear at node NO from each of the channels A through D. Offsetting the output waveforms from the different channels A through D tends to significantly reduce the amount of ripple appearing in the output voltage $V_B$ at node NO. During operation, the boost controller 26 may implement maximum power point tracking (MPPT), which is a technique known to those skilled in the art, to harvest the maximum power from the solar panels 12 based on their output at any given time.

In one embodiment, the transistors T1-T8 and the diodes D1-D12 are silicon carbide power devices. The transistors T1-T8 may be metal on semiconductor field effect transistors (MOSFETs), Insulated Gate Bipolar junction Transistors (IGBTs), and the like. The diodes D1-D12 may be Silicon PIN or Schottky diodes.

By using silicon carbide for transistors T1-T8 and diodes D1-D12, the transistors can be hard switched, as opposed to soft switched, and operate at much higher switching frequencies than silicon-based systems. Hard switching occurs when neither the voltage across nor the current through the transistor is zero when the transistor is turned on or off from an opposite state. Soft switching generally requires additional circuitry and more complex switching control to ensure that either the voltage across the transistor or the current through the transistor is zero when the transistor is turned on or off from the opposite state. As such, the boost controller 26 need not employ as complicated of a control scheme when hard switching is allowed and the electronics are much simpler, take up less space, and weigh less because additional soft switching circuitry is not necessary. Exemplary silicon carbide transistors are C2M0080120D, and exemplary silicon carbide diodes are C4D10120D, which are manufactured by Cree, Inc. of Durham, N.C.

The switching frequencies of the transistors T1-T8 of the shunt circuits can exceed 70 kilohertz and may typically fall in a range between 70 kilohertz to 100 kilohertz. An exemplary switching frequency is 75 kilohertz. Silicon-based systems, as opposed to silicon carbide-based systems, are generally limited to operating at 25 kilohertz or less. In general, higher switching frequencies correspond to higher conversion efficiencies. The boost converter 20 may provide output efficiencies of greater than 99%, and even 99.25%, for output power levels at and exceeding 5 kilowatts, 10 kilowatts, and 25 kilowatts at 800 volts, 1000 volts, and higher.

Notably, the circuitry for the boost converter 20, including the relatively large common mode chokes CH1, CH2 and inductors L1, L2, L3, L4, may be provided on a single printed circuit board (PCB). In this configuration (and including the printed circuit board and illustrated electronics), the boost converter 20 has a power-to-weight ratio that can exceed 7 kilowatts per kilogram and operate in the range of 7 kilowatts per kilogram to 21 kilowatts per kilogram. When providing power at these levels, forced-air cooling may be necessary.

Figure 3:
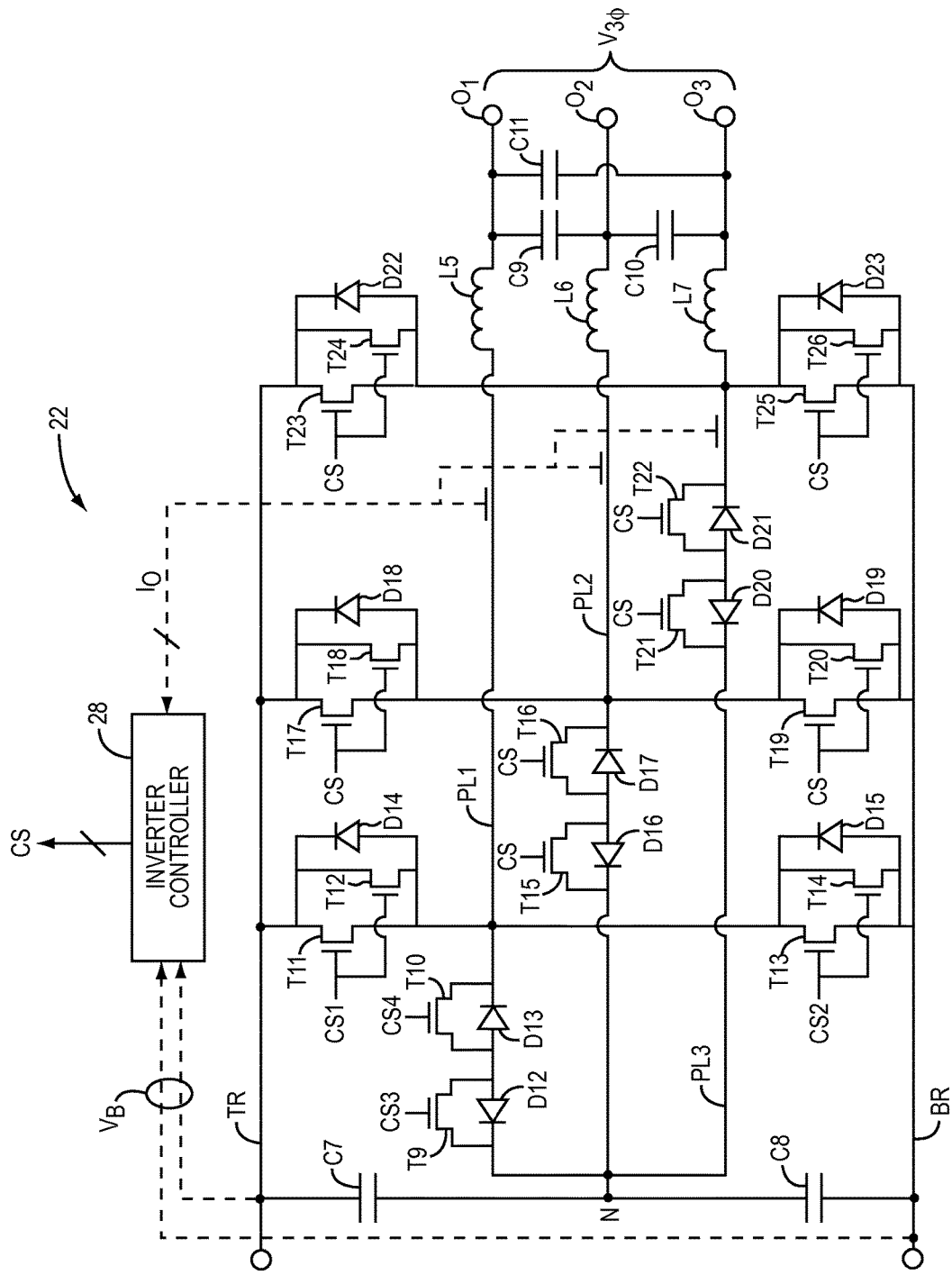
FIG. 3 is a schematic for a three-phase inverter according to one embodiment of the disclosure.

With reference to FIG. 3, an exemplary configuration for a three-phase inverter 22 is provided. While many different types of inverters may take advantage of the concepts disclosed herein, a three level T-type inverter architecture is used in this example. In general, the three-phase inverter 22 includes three phase legs PL1, PL2, and PL3, a top rail TR, and a bottom rail BR. The circuitry for the three phase legs PL1, PL2, and PL3 work in analogous fashion. Each of the phase legs PL1, PL2, and PL3 functions to convert the DC output voltage $V_B$ from the boost converter 20 to a sinusoidal output. The only difference is that AC voltages and currents at the outputs $O_1$, $O_2$, and $O_3$ of the three phase legs PL1, PL2, and PL3 are 120 degrees out-of-phase with one another. The circuitry and operation of phase leg PL1 is initially described in detail.

The three-phase inverter 22 includes two series capacitors C7, C8, which are coupled between the top rail TR and the bottom rail BR. The node provided between the capacitors C7, C8 provides a neutral node N. The neutral node N represents a common point from which each of the phase legs PL1, PL2, and PL3 branch.

Phase leg PL1 includes a bidirectional auxiliary switch and an inductor L5 connected in series between the neutral node N and the output $O_1$. The bidirectional auxiliary switch includes two transistors T9, T10, and two diodes D12, D13. The bidirectional auxiliary switch is configured such that current may flow from the neutral node N to the output $O_1$ through transistor T9 and diode D13 and may flow from the output $O_1$ to the neutral node N through transistor T10 and diode D12, under certain conditions that will be described further below.

A node between the bidirectional auxiliary switch and the inductor L5 is coupled to the top rail TR via an upper main switch and coupled to the bottom rail BR via a lower main switch. The upper main switch is switching circuitry that includes two parallel-connected transistors T11, T12 and at least one anti-parallel diode D14, which may be an external diode or a body diode for one of the transistors T11, T12. Similarly, the lower main switch includes two parallel-connected transistors T13, T14 and at least one anti-parallel diode D15, which may be an external diode or a body diode for one of the transistors T13, T14. The drains, gates, and sources for the transistors T11, T12 are each respectively directly coupled together. The drains, gates, and sources for the transistors T13, T14 are coupled in the same fashion. The upper and lower main switches are each considered primary switching circuitry in this embodiment. The primary switching circuitry for an inverter will include those transistors that switch the largest currents and/or voltages.

The three-phase inverter 22 also includes an inverter controller 28, which may be analog or digital and configured to provide independent control signals CS for the bidirectional auxiliary switches, the upper main switches, and the lower main switches for each of the legs PL1, PL2, and PL3. With primary reference again to phase leg PL1, four control signals are employed. A first control signal CS1 is provided to the gates of the two transistors T11, T12 in the upper main switch; a second control signal CS2 is provided to the gates of transistor T13, T14 in the lower main switch; a third control signal CS3 is provided to the gate of transistor T9 in the bidirectional auxiliary switch, and a fourth control signal CS4 is provided to the gate of transistor T10 in the bidirectional auxiliary switch.

As noted, the goal for each of the phase legs PL1, PL2, and PL3 is to create a sinusoidal AC output signal from a DC signal, which in this case is the output voltage $V_B$ from the boost converter 20. For phase leg PL1, there are essentially three operational states. The first state corresponds to the positive half cycle of the sinusoidal AC output signal, the second state corresponds to the negative half cycle of the sinusoidal AC output signal, and the third state corresponds to the zero crossing of the sinusoidal AC output signal.

During the first state when the positive half cycle is being generated, control signals CS2 and CS4 are configured to turn off parallel transistors T13, T14 of the lower main switch as well as turn off the transistor T10 of the bidirectional auxiliary switch. Further, control signals CS1 and CS3 are configured to switch the parallel transistors T11, T12 of the upper main switch and transistor T9 of the bidirectional auxiliary switch on and off in a complementary fashion. As such, the node between the bidirectional auxiliary switch and the inductor L5 is rapidly switched between the top rail TR and the neutral node N during the positive half cycle to control the positive current flow through the inductor L5. In one embodiment, the control signals CS1 and CS3 are complementary, sinusoidal PWM signals that provide more narrow (lower duty cycle) pulses at the beginning and end of the positive half cycle than in the middle of the positive half cycle.

During the second state when the negative half cycle is being generated, control signals CS1 and CS3 are configured to turn off parallel transistors T11, T12 of the upper main switch as well as turn off the transistor T9 of the bidirectional auxiliary switch. Further, control signals CS2 and CS4 are configured to switch the parallel transistors T13, T14 of the lower main switch and the transistor T10 of the bidirectional auxiliary switch on and off in a complementary fashion. As such, the node between the bidirectional auxiliary switch and the inductor L5 is rapidly switched between the bottom rail BR and the neutral node N during the negative half cycle to control the negative current flow through the inductor L5. As for the positive half cycle, the control signals CS1 and CS3 may also be complementary, sinusoidal PWM signals. About a zero crossing in the AC output signal (third state), all of the transistors in the upper main switch, lower main switch, and bidirectional auxiliary switch may be turned off by their corresponding control signals CS1 through CS4.

Operation and configuration of phase legs PL2 and PL3 are analogous to phase leg PL1. Phase leg PL2 includes a bidirectional auxiliary switch and an inductor L6 connected in series between the neutral node N and the output $O_2$. The bidirectional auxiliary switch includes two transistors T15, T16, and two diodes D16, D17. A node between the bidirectional auxiliary switch and the inductor L6 is coupled to the top rail TR via an upper main switch and coupled to the bottom rail BR via a lower main switch.

The upper main switch includes two parallel-connected transistors T17, T18 and at least one anti-parallel diode D18, which may be an external diode or a body diode for one of the transistors T17, T18. Similarly, the lower main switch includes two parallel-connected transistors T19, T20 and at least one anti-parallel diode D19, which may be an external diode or a body diode for one of the transistors T19, T20. The drains, gates, and sources for the transistors T17, T18 are each respectively directly coupled together. The drains, gates, and sources for the transistors T19, T20 are coupled in the same fashion. Refer to the description associated with phase leg PL1 for details associated with the configuration of the control signals.

Phase leg PL3 also includes a bidirectional auxiliary switch and an inductor L7 connected in series between the neutral node N and the output $O_3$. The bidirectional auxiliary switch includes two transistors T21, T22, and two diodes D20, D21. A node between the bidirectional auxiliary switch and the inductor L7 is coupled to the top rail TR via an upper main switch and coupled to the bottom rail BR, via a lower main switch.

The upper main switch includes two parallel-connected transistors T23, T24 and at least one anti-parallel diode D22, which may be an external diode or a body diode for one of the transistors T23, T24. Similarly, the lower main switch includes two parallel-connected transistors T25, T26 and at least one anti-parallel diode D23, which may be an external diode or a body diode for one of the transistors T25, T26. The drains, gates, and sources for the transistors T23, T24 are each respectively directly coupled together. The drains, gates, and sources for the transistors T25, T26 are coupled in the same fashion. Refer to the description associated with phase leg PL1 for details associated with the configuration of the control signals. Also note that capacitors C9, C10, and C11 are coupled between the respective outputs $O_1$, $O_2$, and $O_3$.

To maintain the appropriate phase, frequency, and amplitude of the three sinusoidal AC output signals provided at the outputs $O_1$, $O_2$, and $O_3$, the inverter controller 28 may monitor the output currents $I_O$ of the various phase legs PL1, PL2, and PL3 along with the DC output voltage $V_B$ from the boost converter 20 and generate the various control signals CS based thereon. Those skilled in the art will appreciate that alternative inverter configurations are available, and that the concepts of the present disclosure are applicable to these configurations. Further, those skilled in the art will recognize alternative control schemes for generating the desired AC output signals.

As in the boost converter 20, the transistors T9-T26 and the diodes D12-D23 of the three-phase inverter 22 may be silicon carbide power devices. The transistors T9-T26 may be MOSFETs, IGBTs, and the like. The diodes D12-D23 may be Silicon Pin or Schottky diodes. Exemplary silicon carbide transistors are C2M0080120D, and exemplary silicon carbide diodes are C4D10120D, which are manufactured by Cree, Inc. of Durham, N.C.

By using silicon carbide for transistors T9-T26 and diodes D12-D23, the transistors can be hard switched, as opposed to soft switched, and operate at much higher switching frequencies than silicon-based systems. As such, the inverter controller 28 need not employ as complicated of a control scheme when hard switching is allowed and the electronics are much simpler, take up less space, and weigh less because additional soft-switching circuitry is not necessary. The switching frequencies of the transistors T9-T26 of the shunt circuits can exceed 35 kilohertz and may typically fall in a range between 35 kilohertz to 60 kilohertz. An exemplary switching frequency is 35 kilohertz. Further, the overall inverter system 14, including the housing 24 and all of the electronics therein, may have a weight and an output power-to-weight ratio greater than 1 kilowatt/kilogram, for an air cooled system. In one embodiment, the inverter system 14 can achieve an output power-to-weight ratio between about 1 kilowatt/kilogram and 3 kilowatts/kilogram.

Those skilled in the art will recognize improvements and modifications to the preferred embodiments of the present disclosure. All such improvements and modifications are considered within the scope of the concepts disclosed herein and the claims that follow.

What is claimed is:
1. A power conversion apparatus comprising:
a housing;
a DC-DC conversion circuit configured to convert a first DC signal to a second DC signal and comprising first primary switching circuitry comprising:
silicon carbide transistors that are hard switched during a conversion process; and
at least one main signal path that comprises a pair of parallel silicon carbide diodes that are placed in series in the at least one main signal path; and
an inverter configured to convert the second DC signal to a sinusoidal AC signal and comprising second primary switching circuitry comprising silicon carbide transistors that are hard switched during the conversion process.

2. The power conversion apparatus of claim 1 wherein the power conversion apparatus has a weight and an output power-to-weight ratio that can exceed 1 kilowatt/kilogram.

3. The power conversion apparatus of claim 1 wherein the power conversion apparatus has a weight and an output power-to-weight ratio that can achieve between about 1 kilowatt/kilogram and 3 kilowatts/kilogram.

4. The power conversion apparatus of claim 1 wherein at least two of the silicon carbide transistors for both the first and second primary switching circuitry are directly coupled in parallel with one another.

5. The power conversion apparatus of claim 1 further comprising a first controller and a second controller and wherein:
the power conversion apparatus has a weight and an output power-to-weight ratio that can achieve between about 1 kilowatt/kilogram and 3 kilowatts/kilogram;
at least two of the silicon carbide transistors for both the first and second primary switching circuitry are directly coupled in parallel with one another;
the first controller is configured to switch the silicon carbide transistors of the first primary switching circuitry between on and off states at a frequency of between 70 kilohertz and 100 kilohertz during DC-to-DC conversion; and
the second controller is configured to switch the silicon carbide transistors of the second primary switching circuitry between on and off states at a frequency of between 35 kilohertz and 60 kilohertz during AC-to-DC conversion.

6. The power conversion apparatus of claim 1 further comprising a controller that is configured to switch the silicon carbide transistors of the first primary switching circuitry between on and off states at a frequency of between 70 kilohertz and 100 kilohertz during DC-to-DC conversion.

7. The power conversion apparatus of claim 1 further comprising a controller that is configured to switch the silicon carbide transistors of the second primary switching circuitry between on and off states at a frequency of between 35 kilohertz and 60 kilohertz during AC-to-DC conversion.

8. A power conversion apparatus comprising:
a housing;
boost converter circuitry comprising:
silicon carbide transistors that are hard switched during a conversion process; and
at least one main signal path that comprises a pair of parallel silicon carbide diodes that are placed in series in the at least one main signal path; and
a controller that is configured to switch the silicon carbide transistors between on and off states at a frequency of between 70 kilohertz and 100 kilohertz during DC-to-DC conversion.

9. The power conversion apparatus of claim 8 further comprising inverter circuitry having silicon carbide transistors that are hard switched during the conversion process.

10. The power conversion apparatus of claim 9 further comprising an inverter controller that is configured to switch the silicon carbide transistors of the inverter circuitry between on and off states at a frequency of between 35 kilohertz and 60 kilohertz during AC-to-DC conversion.

11. The power conversion apparatus of claim 8 wherein the power conversion apparatus has a weight and an output power-to-weight ratio that can exceed 1 kilowatt/kilogram.

12. The power conversion apparatus of claim 8 wherein the power conversion apparatus has a weight and an output power-to-weight ratio that can achieve between about 1 kilowatt/kilogram and 3 kilowatts/kilogram.

13. The power conversion apparatus of claim 8 wherein the silicon carbide transistors are MOSFETs.

14. The power conversion apparatus of claim 8 wherein the silicon carbide transistors are IGBTs.

* * * * *